United States Patent
Aulagnier

(10) Patent No.: US 7,334,178 B1
(45) Date of Patent: Feb. 19, 2008

(54) RANDOMIZED SELF-CHECKING TEST SYSTEM

(75) Inventor: Pierre Aulagnier, Sunnyvale, CA (US)

(73) Assignee: Xsigo Systems, Sunnyvale, CA (US)

( * ) Notice: Subject to any disclaimer, the term of this patent is extended or adjusted under 35 U.S.C. 154(b) by 122 days.

(21) Appl. No.: 11/222,590

(22) Filed: Sep. 9, 2005

(51) Int. Cl.
*H03M 13/00* (2006.01)
*H04L 9/00* (2006.01)
*G06F 11/30* (2006.01)

(52) U.S. Cl. .............. 714/758; 714/776; 714/786; 713/160; 713/190

(58) Field of Classification Search ............ None
See application file for complete search history.

(56) References Cited

U.S. PATENT DOCUMENTS

| | | | |
|---|---|---|---|
| 6,804,257 B1 * | 10/2004 | Benayoun et al. | 370/471 |
| 7,203,842 B2 * | 4/2007 | Kean | 713/189 |
| 2003/0028716 A1 * | 2/2003 | Sved | 711/111 |
| 2004/0218579 A1 * | 11/2004 | An | 370/349 |
| 2006/0059400 A1 * | 3/2006 | Clark et al. | 714/752 |

OTHER PUBLICATIONS

Wong et al., "Effective Generation of Test Sequences For Structural Testing of Concurrent Programs", IEEE International Conference of Complex Computer Systems (ICECCS'05), 2005.

* cited by examiner

*Primary Examiner*—Phung M. Chung
(74) *Attorney, Agent, or Firm*—Beyer Weaver LLP

(57) ABSTRACT

Methods and apparatus are provided for verifying and validating operation of a design under test (DUT). Input data sequences having information used to check expected outputs are provided to a DUT. The input data sequences include checking headers and data. The checking headers and data are randomized using encryption to verify and validate operation of the DUT on a variety of bit sequences. Different keys are used to allow further scrambling.

34 Claims, 11 Drawing Sheets

| Ethernet Header 201 | IP Header 203 | TCP Header 205 | Checking Header 207 | Data 211 | Checking Header 213 | Data 215 |

Figure 2

RANDOMIZED SELF-CHECKING TEST SYSTEM

BACKGROUND OF THE INVENTION

1. Field of the Invention

The present invention relates to design testing. In one example, the present invention relates to methods and apparatus for efficiently allowing verification and validation of a design using randomized, self-checking test sequences.

2. Description of Related Art

Verification and validation testing is used to determine that operation of a design is correct, complete, consistent, and meets the requirements of its intended use. A variety of schemes can be used to verify and validate operation of a design. Testing can be performed by using a test plan with a complete set of inputs and a complete set of expected outputs. A test input can be provided to a design under test (DUT), sometimes referred to as a device under test, and the output can be verified using the test plan. However, writing a complete and thorough test plan is often not trivial. It is particularly difficult if a design under test handles numerous inputs and provides numerous outputs simultaneously or if particular inputs provided to the design under test affect processing and alter other expected outputs. Writing a test plan with all of the possible combinations and permutations of inputs can be arduous and error prone. It can also be difficult to determine what error occurred.

Other verification and validation environments rely upon the ability to pass information through a DUT in order to be able to check the results. The information is usually passed unmodified through the data path and even through the control path associated with DUT. The information enables verifying and validating the operation of the DUT. However, including information in test inputs also has limitations. Consequently, it is desirable to provide techniques and mechanisms for improving the ability to providing information through a DUT in order to verify and validate operation of the DUT.

SUMMARY OF THE INVENTION

Methods and apparatus are provided for verifying and validating operation of a design under test (DUT). Input data sequences having information used to check expected outputs are provided to a DUT. The input data sequences include checking headers and data. The checking headers and data are randomized using encryption to verify and validate operation of the DUT on a variety of bit sequences. Different keys are used to allow further scrambling.

In one embodiment, a technique for performing verification testing is provided. An input data sequence including a checking header is provided. The checking header includes information characterizing a relationship between the input data sequence and an output data sequence. The input data sequence including the checking header is encrypted to obtain an encrypted input data sequence including an encrypted checking header. The encrypted input data sequence is sent to a design under test. The design under test performs processing on the encrypted input data sequence and provides an encrypted output data sequence. The encrypted output data sequence is decrypted. A relationship between the output data sequence and the input data sequence is determined by using the checking header to determine that the design under test is operating properly.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 2 is a diagrammatic representation showing a data sequence.

DETAILED DESCRIPTION OF SPECIFIC EMBODIMENTS

Figure 1:
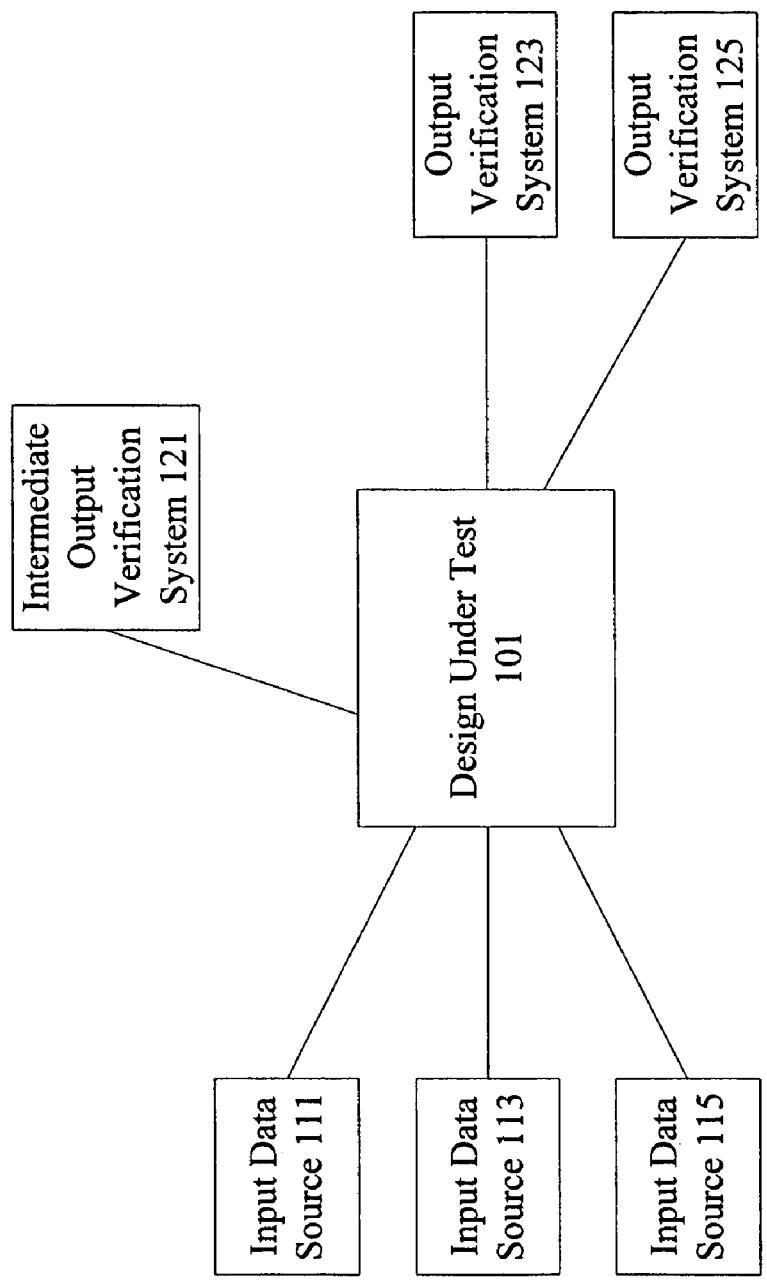
FIG. 1 is a diagrammatic representation showing one system that can use the techniques of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular design under test (DUT) systems and interconnection fabrics. However, it should be noted that the techniques of the present invention can be applied to a variety of different standards and variations. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

Many verification and validation systems rely on the ability to include a checking header in an input test sequence passed to a DUT in order to be able to check the results. Any information included in an input test sequence used to check results is referred to herein as a checking header. In some embodiments, the checking header may relate to the content of the data, the path the data is supposed to follow, a software descriptor, the packet flow, the address where it is stored in memory, or any other data that can create a relationship between the input data and the data at different point of processing handling within or at the output of the DUT. The information is usually passed unmodified through the data path and even through the control path associated with the DUT.

In some examples, the input test sequences are packets or frames passed to a router or switch. Information in the input test sequences is used to verify the packet was processed properly by the router or switch and forwarded through the appropriate port. A checking header allows verification and validation of the behavior of the DUT by using checking header information to compare DUT outputs to expected DUT outputs.

Some of the checking header fields may also be used to recreate the rest of the data typically by having seed and/or increment information. It is relatively important to provide a thorough set of test inputs in order to effectively verify and validate a DUT. In some examples, the data portion of input test sequences is randomized so that a variety of different data sequences are handled by a DUT. However, a checking header is in many instances not randomized, because the checking header information is needed to determine if the DUT output matches the expected DUT output.

However, the techniques of the present invention recognize that the checking header has not been thoroughly randomized. The checking header typically includes repeat information, such as path numbers that are typically the same, flow numbers the only fall within a specific range, or memory addresses that map to only a portion of the memory space. Many possible checking header values are never fed to a DUT. Consequently, it can not be fully determined if the DUT can handle particular checking header bit sequences.

The problem becomes more pronounced as the checking header becomes a larger portion of the test input sequence. For example, some switches may divide large packets into smaller packets prior to sending them to output ports. Consequently, the techniques of the present invention recognize that checking headers have to be placed frequently enough in a packet to allow even the divided smaller packets to include checking headers. In one example, a switch may divide a packet into 64 bit units to allow a move into 64 bit memory. A checking header typically occupies more than 16 bits, and since it is necessary to place a checking header in each memory word in order to verify and validate output, a full 25% of a 64 bit unit may not be fully randomized. The 48 bit data section may be randomized, but the 16 bit checking header may often include the same bit sequences.

The techniques of the present invention allow full randomization of the checking header bits while still keeping the ability to retrieve the checking header and thus the ability to check the targeted behavior of the DUT. The ability to randomize all the bits of an input data sequence necessary in order to provide adequate coverage of the data path. Without sufficient coverage of the data path, the validation of the DUT can not be fully complete.

The techniques of the present invention can be applied to a variety of self-checking environments, but is particularly suitable for the verification of high speed data transfer protocols like PCI Express, PCI Advanced Switching, related protocols and associated devices such as resource virtualization switches. The techniques of the present invention provide an efficient and economical way to create thorough self-checking test environments without having to implement a closed system.

According to various embodiments, an input data sequence including the checking header and the data are encrypted to allow randomization of the input data sequence. A key is maintained to allow decryption at a particular output. The techniques of the present invention recognize that even with encryption, encrypted sequences may often have similar bit configurations. Consequently, the techniques of the present invention contemplate periodically rotating keys or even rotating encryption algorithms to provide a thorough set of test sequences. Encryption can be activated or deactivated. In one stage of testing, encryption can be deactivated to allow testing of the test sequences and the checking headers themselves. In another stage of testing, encryption can be deactivated to allow checking of a test set. In yet another stage of testing, encryption can be activated to provide a more thorough and randomized test set.

FIG. 1 is a diagrammatic representation showing one example of a design under test. According to various embodiments, a design under test (DUT) 101 includes a variety of inputs, intermediate outputs, and outputs. In some examples, the inputs, intermediate outputs, and outputs are input ports, intermediate output ports, and output ports. In other examples, the inputs, intermediate outputs, and outputs are lines on printed circuit board (PCB). In one example, input data sources 111, 113, and 115 simulate operation of servers connected to a switch. Input data sources 111, 113, and 115 may also be other devices or switches. Output verification systems 123 and 125 are used to verify and validate the DUT 101 output. The DUT 101 may also perform multiple stages of processing and an intermediate output verification system 121 can be used to verify intermediate stage values provided by a DUT. Output verification systems 123 and 125 can be connected to output ports or output lines. Output verification systems can be used to verify that output sequences are provided as expected.

In some conventional systems, a particular input is provided at an input data source and an expected output is awaited at a particular output verification system. In some examples, all input data sources and output verification systems are lines connected to a single testing computer system.

FIG. 2 is a diagrammatic representation showing one example of a data sequence that can be used as a test input to a DUT. A packet having an Ethernet header 201, an Internet Protocol (IP) header 203, and a TCP header 205 is provided. In some examples, other fields and values may be included in the headers. Checking headers 207 and 213 are also included. According to various embodiments, a checking header is used to describe information used to verify the data 211 is processed properly by a DUT. Multiple checking headers 213 may be used as a packet may be segmented into multiple blocks. In one example, checking headers 207 and 213 are provided at segment boundaries and associated with data 211 and 215. The checking headers 207 and 213 may be included in a variety of header and payload portions of a packet. In one particular example, data fields are 48 bits in width while the checking headers are 16 bits in width.

Data 211 and 215 may be conventional packet payload data, while a checking header may describe the content of the data, the path the data is supposed to follow, pointer information, the packet flow, the address where it is stored in memory, or any other data that can create a relationship between the input data and the data at different point of processing handling within or at the output of the DUT. In some systems, data 211 and 215 can be varied widely without affecting system operation. Different values can be placed in data portions 211 and 215 to verify that the DUT can handle a complete range of bit sequences. However, in many systems, the checking headers 207 and 213 can not be randomized because the information included is used to verify the output. Some effort can be made to vary checking header values, but flow numbers and memory address values typically only fall within a certain range. The full range of checking header values typically remains untested. Consequently, the techniques of the present invention recognize that full operation of the DUT is not adequately tested.

According to various embodiments, the checking headers 207 and 213 are encrypted to allow randomization of checking header 207 and 213 bit sequences to verify and validate processing at the DUT. Data 211 and 215 can also be encrypted to allow thorough testing. The techniques of the present invention recognize that values provided in checking headers 207 and 213 and data fields 211 and 215 can be more thoroughly scrambled by varying keys and cryptographic algorithms used to encrypt the headers 207 and 213 and data fields 211 and 215. According to various embodiments, the key and cryptographic algorithms used are maintained globally and varied during different test stages.

Figure 3:
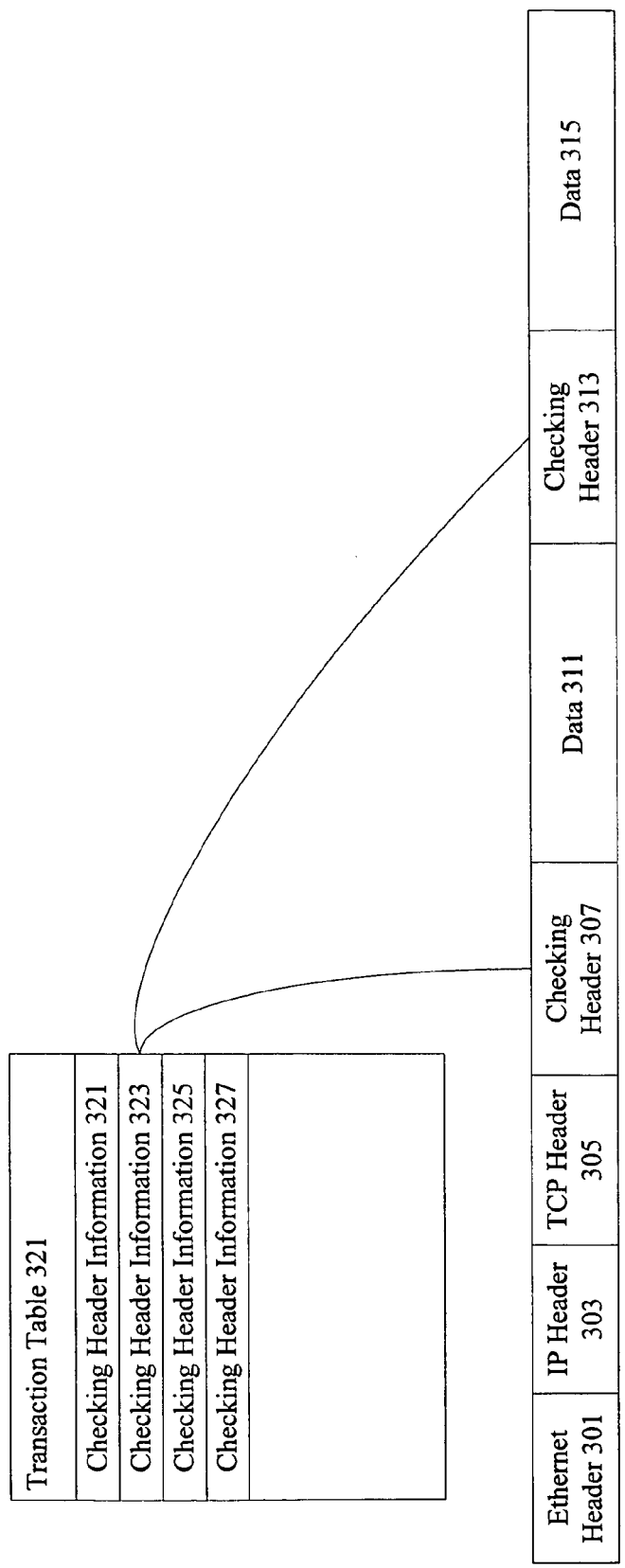
FIG. 3 is a diagrammatic representation showing a transaction table.

FIG. 3 is a diagrammatic representation showing one example of a transaction table. A packet having an Ethernet header 301, an Internet Protocol (IP) header 303, and a TCP header 305 is provided. In some examples, other fields and values may be included in the headers. Checking headers 307 and 313 are also included. According to various embodiments, a checking header is used to describe information used to verify that data 311 is processed properly by a DUT. Multiple checking headers 313 may be used as a packet may be segmented into multiple blocks. In one example, checking headers 307 and 313 are provided at segment boundaries and associated with data 311 and 315.

During processing by a DUT, various headers may be modified as a data sequence is routed or switched. Data may be segmented, copied into memory, and later repacketized. Some protocols may require that packets be processed in order, while other systems may require that packets be correctly processed despite particular system failures or external device failures. The DUT may itself be a redundant system that should be partially disabled during various stages of testing. Scrambling the checking headers 307 and 313 and data 311 and 315 help sure that testing is complete and thorough.

Checking headers 307 and 313 may include a variety of information. In some examples, checking headers 307 and 313 include flow numbers, transaction identifiers, sequence numbers, data fields, addresses, path configurations, etc. In one particular example, the checking headers 307 and 313 include pointers or references to transaction table 321 entries. Information is maintained in the transaction table 321 having entries 321, 323, 325, and 327 to allow checking headers 307 and 313 to remain relatively small while also allowing maintenance of a large amount of information. In some examples, multiple checking headers 307 and 313 in a single packet reference the same transaction table entry 323.

The transaction table entry 323 includes information such as data path, originating server, sequence number, or any other information characterizing an output data sequence to allow verification of DUT operation.

According to various embodiments, by using cryptographic algorithms instead of simply scrambling data, any 64 bits of data can be signed. In some DUTs, data may be read and written in pieces in any order, as Direct Memory Address (DMA) engines are widely used. Using the techniques of the present invention, data can be mapped to its origin or to its target without having to wait until all data is received. Enough information is provided in checking headers to allow determinations of origin or target information. The techniques of the present invention can be useful for disk requests that are much larger than usual packets. In one example, there are hundreds of active queues and each queues includes megabytes of RDMA data in transfer. All of the data can come in chunks of different sizes can be arranged out of order. In some embodiments, an entire header block and data block is in itself a checking header including information used for verification. In one embodiment, instead of maintaining merely 16 bits of checking header information in a 64 bit segment, all 64 bits can be used as a checking header. In fact, substantially all or all of a segment can be used as a checking header while still allowing randomization. Various encryption and hash algorithms can be used.

Figure 4:
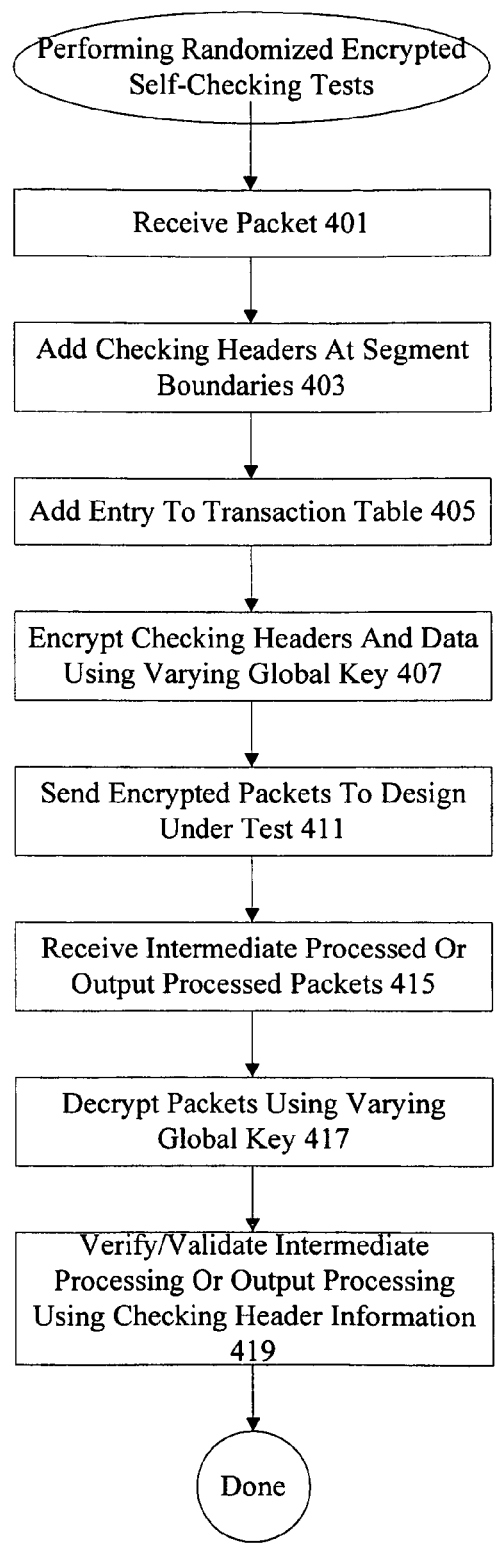
FIG. 4 is a flow process diagram showing test sequence processing.

FIG. 4 is a flow process diagram showing one example of performing randomized encrypted self-checking tests. At 401, a packet is received. In one example, a packet is received from a server and a DUT is a resource virtualization switch. Checking headers are added to the packet at 403. Checking headers may be added at segment boundaries to provide checking header information even if the packet is divided. At 405, an entry is added to a transaction table. The entry may include any information used to characterize and output from the DUT. The checking header includes a pointer or a reference to the transaction table entry. At 407, checking headers and other data are encrypted using a varying global key. According to various embodiments, the global key is varied periodically to provide more thoroughly randomized ciphertext. At 411, the encrypted packet is sent to the DUT. At 415, intermediately processed or output processed packets are received. At 417, the encrypted packets are decrypted using the global key. In one embodiment, the key can be changed after each test run to allow further randomization. At 419, intermediate or output processing is verified and validated using checking header information.

It should be noted that encryption can be enabled or disabled for debugging purposes. For example, a clear debugging test with no header or data randomization can be run with a simple function call such as the following.

```
if (scrambling==on) {
   header/data=scramble(header/data,key)
}
```

The code on the receiving side can be the same for symmetric functions. If scrambling is on, then descramble is called. If scrambling is not enabled, no additional processing is required. Although the test system according to various embodiments of the present invention can be used to test a variety of systems, it is particularly suited to testing high speed data transfer protocols such as PCI Express and PCI Advanced Switching (AS) and related protocols as well as switches such as a resource virtualization switch.

Figure 5A:
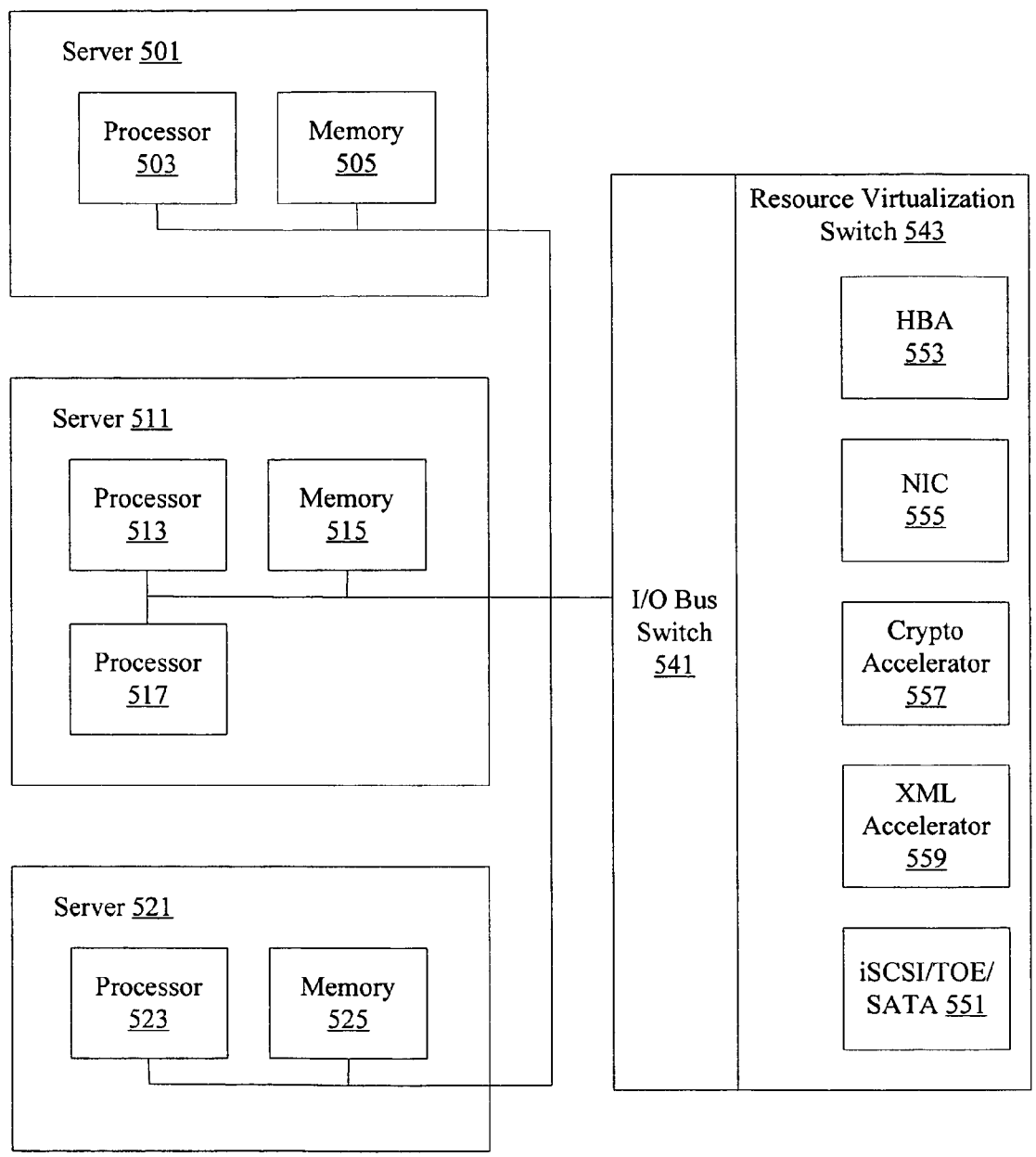
FIGS. 5A-5B are diagrammatic representations showing a resource virtualization switch that can be tested using the techniques of the present invention.

FIG. 5A is a diagrammatic representation showing separate servers connected to a resource virtualization switch 543. Server 501 includes processor 503 and memory 505. Server 511 includes processors 513 and 517 and memory 515. Server 521 includes only processor 523 and memory 525. Components and peripherals in each server 501, 511, and 521 are connected using one or more I/O buses. It should be noted that a server can be a virtual server such as a guest operating system, an application, or a virtual machine. According to various embodiments, the I/O bus is extended to allow interconnection with other servers and external entities through an I/O bus interconnect such as an I/O bus switch 541. In one example, server 501 no longer uses addresses such as port world wide names (pwwns) associated with an HBA or media access control (MAC) addresses associated with a NIC to communicate with other servers and external networks, but each server is instead configured communicate with a resource virtualization switch 543 using an I/O bus switch 541.

An I/O bus switch 541 may be a standalone entity, integrated within a particular server, or provided with a resource virtualization switch 543. According to various embodiments, components such as HBA 553, NIC 555, a cryptographic accelerator 557, an XML accelerator 559, Internet SCSI (iSCSI)/TCP Offload Engine (TOE)/Serial ATA (SATA) 551, can be offloaded from servers 501, 511, and 521 onto a resource virtualization switch 543. The resources including HBA 553, NIC 555, cryptographic accelerator 557, XML accelerator 559, and iSCSI/TOE/SATA 551 are maintained in a shared and virtualized manner on a resource virtualization switch 543. Links are provided between the resource virtualization switch and external switches such as an IP network switch.

According to various embodiments, a series of servers is connected to the resource virtualization switch using a PCI Express bus architecture. In some cases, a PCI Express bridge is used to increase compatibility with some existing systems. However, a PCI Express bridge is not necessarily needed. By using a resource virtualization switch, the number of resources and links can be significantly reduced while increasing allocation efficiency. Resources can be accessed at the driver level. Virtual resources including service engines can be dynamically bound to servers including system images, guest operating systems, and virtual machines. In one instance, a cryptographic accelerator is bound to a particular system image.

In this example, to perform cryptographic operations associated with sending or receiving data, a server 501 passes data to the resource virtualization switch cryptographic accelerator 557 as though the resource virtualization switch cryptographic accelerator 557 were included in the server 501. To perform XML operations, a server 501 passes data to the XML accelerator 559 as though the XML accelerator 559 is included in the server 501. Alternatively, XML and cryptographic operations can be performed as data is received at a resource virtualization server from a network. Consequently, additional server 501 processor involvement is not needed.

PCI Express is a low-cost, scalable, switched, point-to-point, serial I/O interconnection scheme that maintains backward compatibility with PCI. The PCI Express architecture is specified using an Open System Interconnection (OSI) layer model and uses a load-store addressing architecture with a flat address space to allow interoperability with existing PCI applications. The software layers generate read and write requests that are transported by the transaction layer to the I/O devices using a packet-based, split-transaction protocol. The link layer adds sequence numbers and CRC to these packets to create a highly reliable data transfer mechanism.

The basic physical layer includes a dual simplex channel that is implemented as a transmit pair and a receive pair. Although PCI Express is expected to gain wider acceptance, adoption may be gradual as a large number of existing devices are configured for use with PCI and not PCI Express. Consequently, PCI Express bridges may be needed in certain instances. PCI Express used with the techniques of the present invention provides support for quality of service (QoS), power management, and I/O virtualization. Quality of service and power management improve data integrity and allow control of power consumption.

I/O virtualization allows data to be routed along logical routes, provides allocation of bandwidth to groups of devices, and allows prioritization of traffic patterns. Although the techniques of the present invention will be described in the context of PCI Express, it should be recognized that the techniques of the present invention are not limited to PCI Express and indeed are applicable to other standards and variations to standards such as PCI-AS, RapidIO, Serial RapidIO, InfiniBand, etc.

Figure 5B:
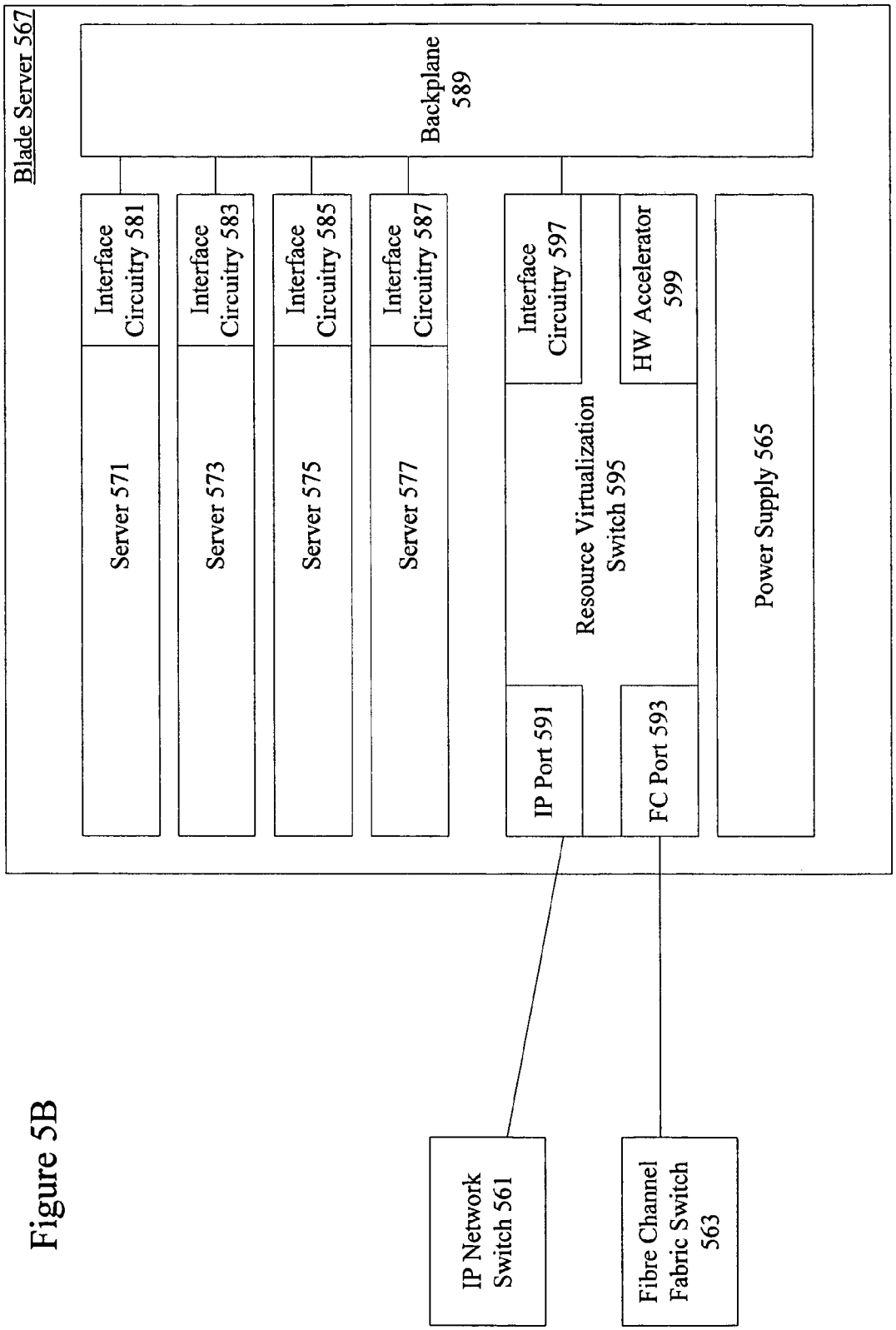

FIG. 5B is a diagrammatic representation showing another example of a servers connected to a resource virtualization switch. Although a particular blade server configuration is being described, it should be noted that a wide variety of system configurations are available. The blade server 567 includes multiple servers 571, 573, 575, and 577. Each server may include a processor and memory. Some servers may include peripheral components and peripheral interfaces as well. According to various embodiments, each server includes circuitry 581, 583, 585, and 587 to interface with a backplane 589. In some embodiments, circuitry 581, 583, 585, and 587 may be bus bridges used to interface with a PCI Express backplane 589. Additional connections between servers may also be provided. For example, an additional Ethernet network may be provided to allow connection between servers 571, 573, 575, and 577. Alternatively, servers 571, 573, 575, and 577 can be configured not only to access resources and switches 561 and 563 over a backplane but also to communicate with each other over the backplane.

Servers 571, 573, 575, and 577 can access resources such as IP port adapter 591, fibre channel port adapter 593, or hardware accelerator 599 on a resource virtualization switch 595. A power supply 565 is also included in the blade server 567. It should be noted that the blade server 567 can support any number of server cards and resource virtualization switches. For example, redundant resource virtualization switches 595 may be included to provide high availability. Each server may be embodied in a case, card, a blade, or even a single integrated circuit (IC) device or portion of an IC device. Techniques for performing interconnection can be implemented on one or more application specific integrated circuits (ASICs) and/or programmable logic devices (PLDs). The entire interconnection mechanism can be provided on a server, a card, a chip, or on a processor itself.

Figure 6:
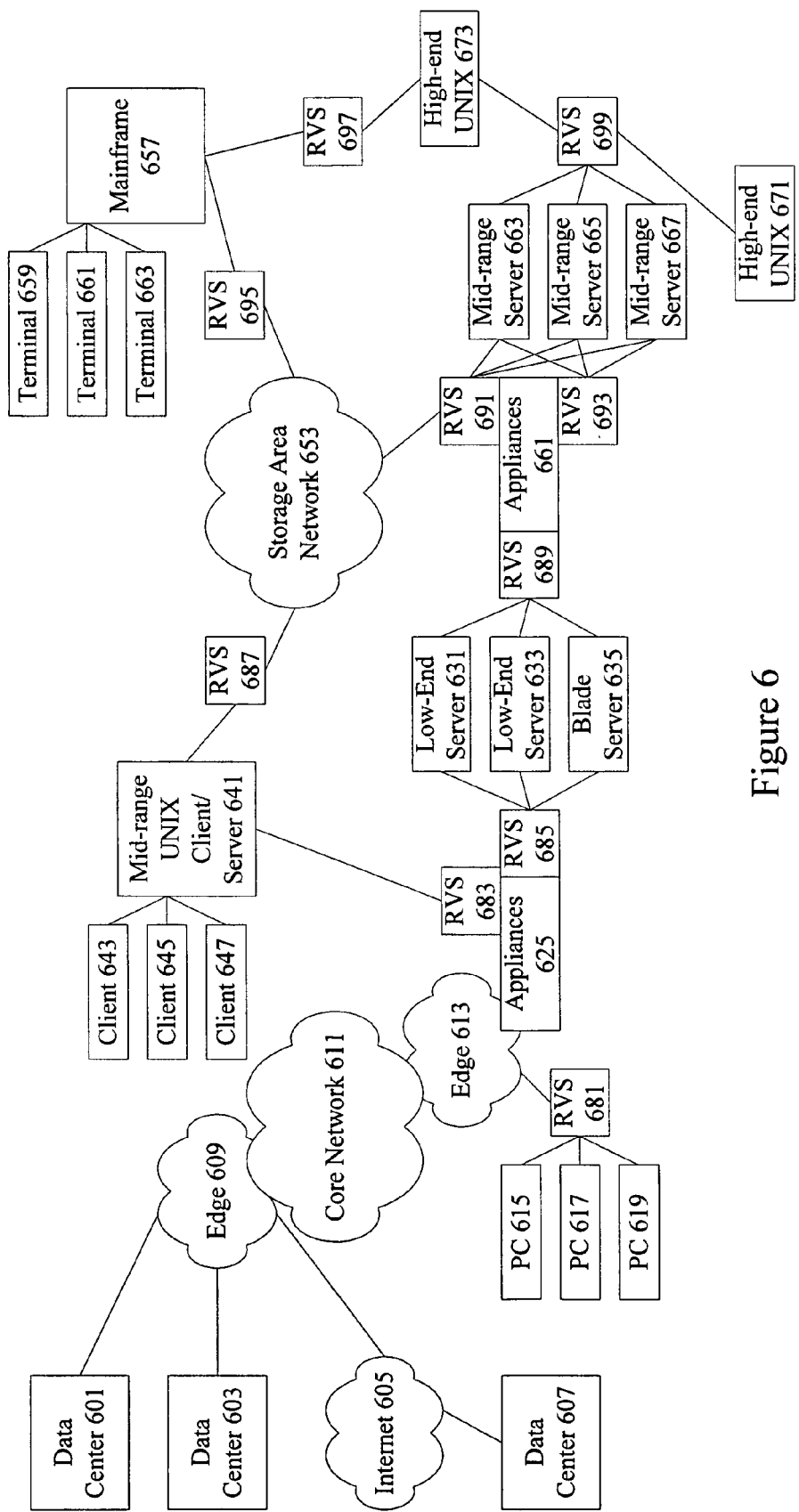
FIG. 6 is a diagrammatic representation showing a data center.

FIG. 6 is a diagrammatic representation showing some examples of where a resource virtualization switch can be implemented in a system such as a data center. In conventional systems, resources are included in individual servers as low-end servers 631, 633, and 635 and personal computers 615, 617, and 619. In conventional systems, resources may include peripheral interfaces and peripheral components. Resources may also be included as appliances 625 and 661 such as SSL, virtual private network (VPN), XML, SLB, and firewall devices. Appliances can be stand alone devices or can be included in a network switch or router. For example, a cryptographic accelerator can be offloaded onto an edge network appliance 625.

However, conventional techniques for offloading or sharing resources such as cryptographic accelerators are expensive, burdensome, and inadequate. Consequently, the techniques of the present invention contemplate providing resources on a resource virtualization switch that is connected to multiple servers over a fabric such as PCI Express. The servers can be configured to share a number of interface and component resources.

A resource virtualization switch 681 can be configured between personal computers 615, 617, 619, and an edge network 613. The edge network 613 is associated with core network 611. The core network 611 allows connection to other data centers 601 and 603 as well as to data center 607 through Internet 605 and edge 609. Another resource virtualization switch 683 may include resources typically provided in appliances 625 such as firewalls, SLB, SSL, VPN, and compression resources. The resource virtualization switch 683 provides virtualized resources to mid-range UNIX client/server 641 which is coupled to clients 643, 646, and 647. Mid-range UNIX client/server 641 is also connected to storage area network 653 using shared and virtualized resources provided by resource virtualization switch 687. Resource virtualization switch 685 and resource virtualization switch 689 provide shared and virtualized resources to low-end servers 631 and 633 as well as to blade server 635.

Redundant resource virtualization switch 691 and 693 are configured to provide fault tolerant resources to mid-range servers 663, 665, and 667 and provide functionality conventionally supplied by appliances 661 or components and interfaces included in servers. In some embodiments, appliances are no longer needed. Resource virtualization switch 699 connects mid-range servers 663, 665, and 667 to high-end UNIX servers 671 and 673. A mainframe 657 can also access shared and virtualized resources in resource virtualization switch 695 and resource virtualization switch 697. Mainframe 657 is associated with terminals 659, 661, and 663. Resource virtualization switches can be situated at a variety of system locations to provide virtualized resources to a number of entities. In some examples, resource virtualization switches are provided to interconnect a series of low-end servers, midrange servers, and high-end servers. Hardware acceleration resources and I/O resources can be aggregated at the resource virtualization switch. A resource virtualization switch can also allow message passing between individual servers using a bus architecture such as PCI express in a highly efficient manner minimizing latency.

Figure 7:
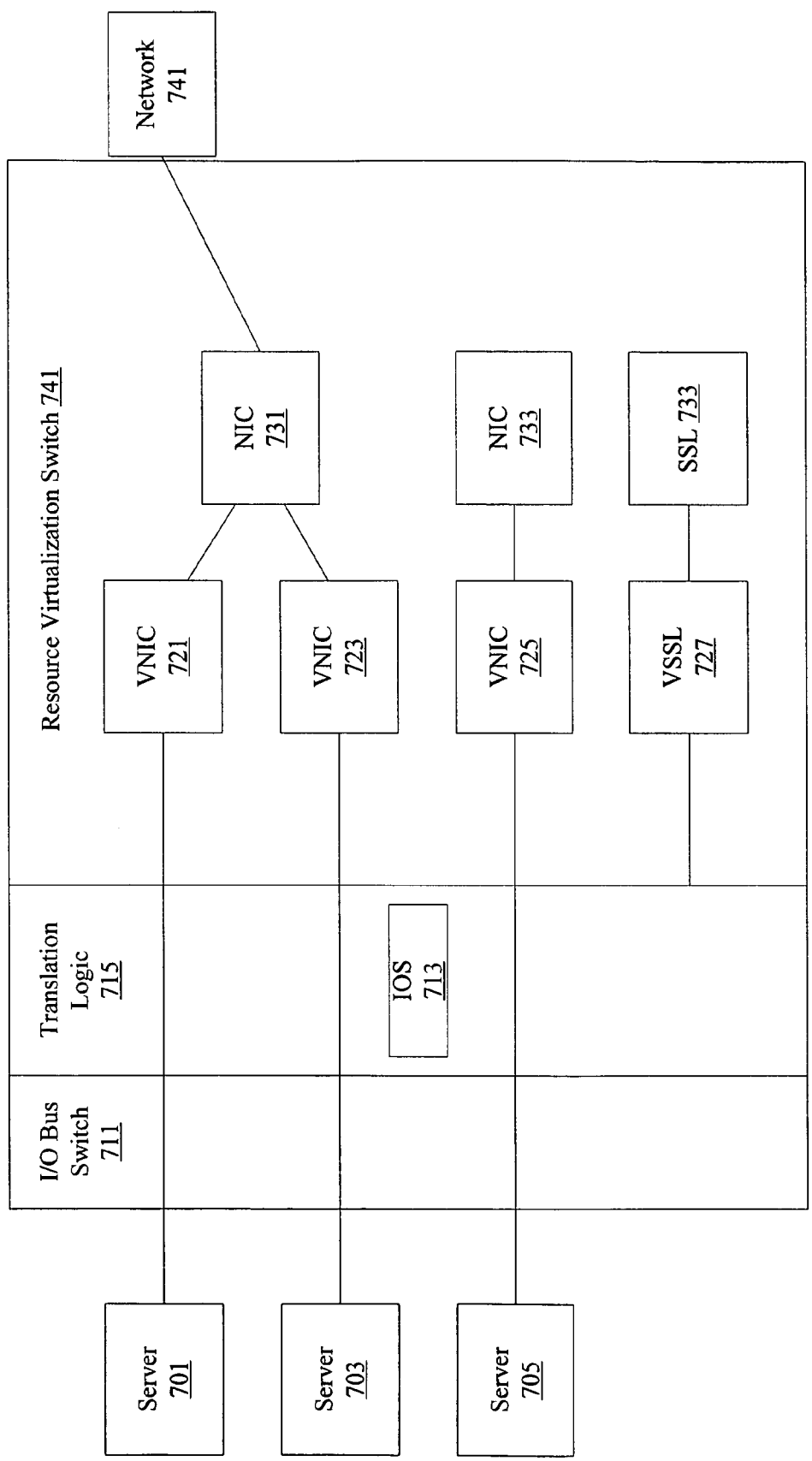
FIG. 7 is a diagrammatic representation showing a resource virtualization switch platform.

FIG. 7 is a diagrammatic representation showing multiple servers mapped to shared resource virtualization switch resources. According to various embodiments, the shared resource virtualization switch resources are designs under test. In some examples, the techniques of the present invention are used to verify that data sequences are being switched, processed, and forwarded properly. According to various embodiments, servers 701, 703, and 705 are connected to VNICs 721, 723, and 725 and VSSL 727. In some embodiments, each VNIC and VSSL is associated with a buffer ring or descriptor ring that servers access in order to write data to the resource virtualization switch. Although a VNIC and a VSSL is used as an example, a variety of other resources can also be virtualized. For example, a VHBA can also be used. For example, the buffer/descriptor ring may include read queues, write queues, and control queues which may not necessarily hold the data itself, but may be used to hold descriptors identifying or referencing the data in memory. Descriptors are used in a number of conventional I/O controller applications. A large number of queues may be provided. In some instances, application specific queues are provided to allow quality of service on an application level. VNICS having packet inspection or deep packet inspection capabilities can snoop packets at a resource virtualization switch and determine which queues to use. Different queues can have different associated quality of service levels.

Consequently, when a server is writing to a VNIC or VSSL, the server will write descriptors into the buffer/descriptor ring of corresponding VNIC or VSSL. In one example, virtual NICs 721 and 723 are coupled to NIC 731. VNICs 721 and 723 each have buffer/descriptor rings accessible by servers bound to those particular VNICs. Similarly, servers may be bound to VNIC 725 and VSSL 727. VNICs and VSSLs are also referred to herein as a virtualization (V) chip, virtualization logic, or virtualization circuitry. According to various embodiments, server to virtualization logic communication traffic is switched by a PCI Express fabric. Each server has a memory window programmed to communicate with other servers and virtualization logic. According to various embodiments, virtualization logic is associated with a combined address map corresponding to all servers. Virtualization logic pulls data from server memory. In some embodiments, the base address and number of descriptor entries are programmed in virtualization logic. For example, a particular VNIC 721 may have base address and descriptor information associated with a particular server. Virtualization logic polls the descriptor ring to find whether any packet is ready to be transmitted. Using bus arbitration mechanisms, virtualization logic can read data associated with the descriptor and forward the information to NIC 731.

Similarly for receive traffic, virtualization logic prefetches descriptors and keeps the buffers, so when virtualization logic receives packets for a particular server, it writes the pre-fetched buffer address and at the end of the write, it assigns the ownership bit to the server processor. The server processor can then read the buffer address and obtain the receive data. In one example, a VNIC chip has 4 ports connected to four separate servers over a PCI Express bus. Each VNIC chip can be coupled to separate conventionally available NICs or can have NIC functionality integrated within each chip.

When a data sequence is received from a server 701, information identifying the server associated with the data sequence is mapped with server 701 and maintained in a database. According to various embodiments, the servers and VNICs and VSSLs communicate using bus arbitration mechanisms available on a PCI Express bus. NICs 731 and 733 communicate with external network entities in the same manner conventional NICs communicate.

VNICs 721, 723, and 725 and VSSL 727 are coupled to servers 701, 703, and 705 through an I/O bus switch 711 and translation logic 715. According to various embodiments, translation logic is used to split PCI Express (10 Gbps) in two 5 Gbps I/O slots each with a SPI-3 interface to support 4 Gbps throughput. The translation logic terminates a PCI Express protocol from the I/O bus and tunnels PCI Express read/write requests over SPI-3 to and from VNICs and VSSLs. Interrupt messages generated are routed from I/O adaptors to translation logic 715 and sent to appropriate servers. Translation logic 715 also provides path to I/O switch chip that switches traffic between different IO adaptors.

The translation logic 715 provides switching capability between multiple I/O adaptors by tunneling SPI-3 packets through PCI Express. The translation logic 715 can also be used to implement in I/O switch or implement a DMA engine. An I/O switch (IOS) 713 can also be provided to allow switching between I/O adapters or resources. According to various embodiments, I/O adapters communicate with each other through translation logic 715 and an associated I/O switch 713. The I/O switch provides a pipe between I/O adapters and resources.

Figure 8:
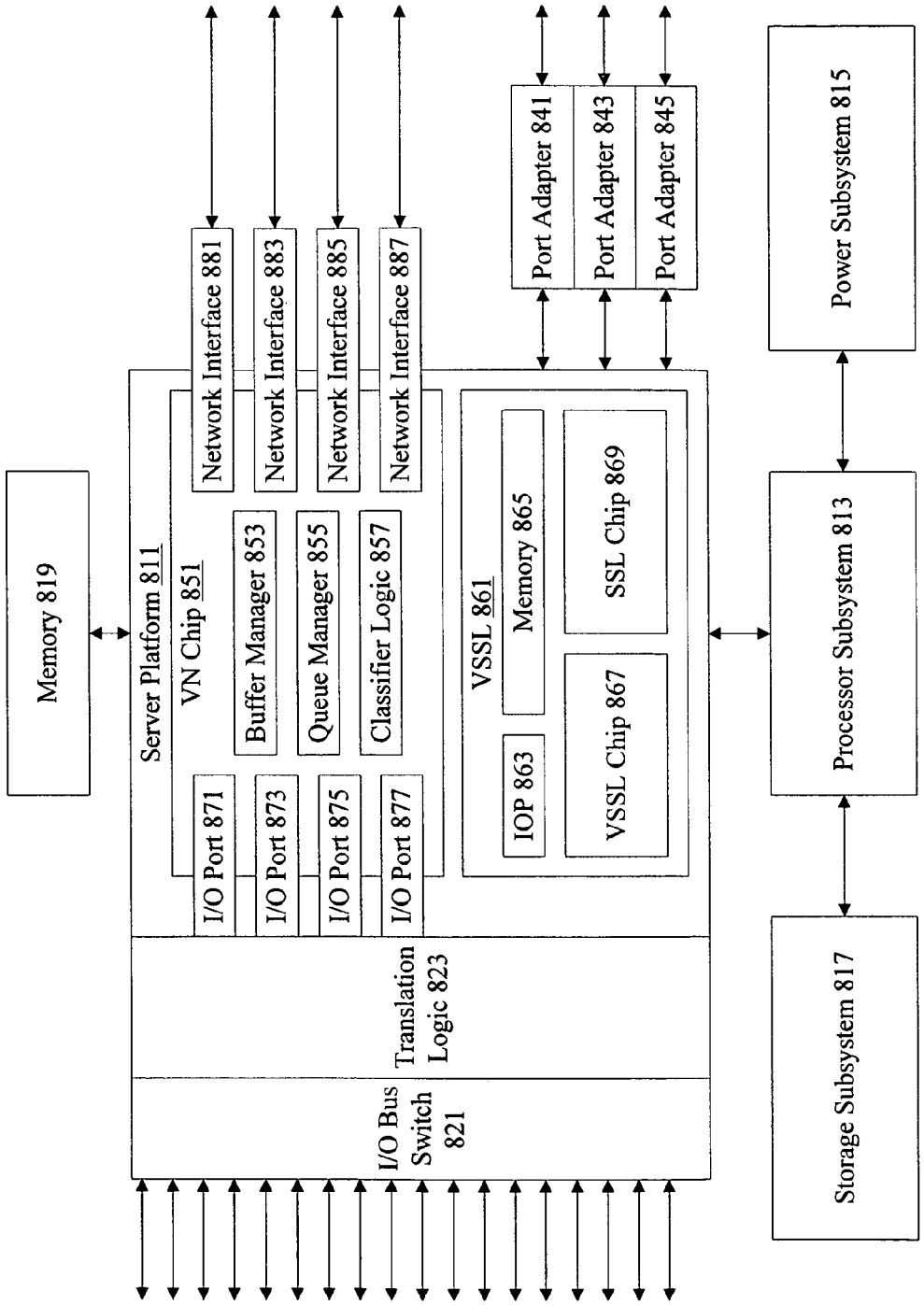
FIG. 8 is a diagrammatic representation showing a resource virtualization switch platform with VNIC and VSSL resources.

FIG. 8 is a diagrammatic representation showing one example of a resource virtualization switch. An I/O bus switch 821 is connected to multiple computer systems using an I/O bus such as a PCI Express bus and translation logic 823. Port adapters 841-845 are associated with multiple resources such as HBAs, sATAs, hardware accelerators, etc. According to various embodiments, a VNIC chip or VN chip 851 has integrated virtualization logic and port adapters in network interfaces 881-887. A VSSL card 861 also has integrated virtualization logic included in VSSL chip 867 as well as an SSL accelerator 869. Although only a VNIC and a VSSL are shown, it should be recognized that a variety of other virtualization mechanisms such as VHBAs and VXMLs can be included. The network interfaces 881-887 may be MAC interfaces associated with multiple gigabyte ports. According to various embodiments, network interfaces 881-887 include logic mechanisms conventionally found in a NIC. The server platform 811 manages interaction between the servers connected to the I/O bus switch 821 and various resources associated with the port adapters 841-845 and network interfaces 881-887.

The server platform 811 is associated with memory 819 and a processor subsystem 813, a power subsystem 815, and a storage subsystem 817. In some embodiments, the server platform 811 includes tables with information mapping various servers connected through the I/O bus switch 821 and various port adapter resources and network interfaces. The processor subsystem 813 is configured to manage port adapter resource as though the port adapters and network interfaces 881-887 were included in individual servers. In one example, the processor subsystem 813 is configured to initialize an IP network connection regardless of whether servers have been connected to the server platform 811.

According to various embodiments, the I/O bus switch 821 supports flexible virtual channel configuration, high availability, and dynamic port configurations. Examples of I/O bus switches include the PCI Express switch PEX 8532 available from PLX Technology, Inc. of Sunnyvale, Calif. and the PCI Express switch PES-48G available from IMC Semiconductor of Agoura Hills, Calif.

Operation of resources including VNICs, VHBAs, VSSL cards, and other devices can be verified using the techniques of the present invention. A VSSL card 861 is coupled to translation logic 823 and the I/O bus switch 821. According to various embodiments a VSSL card 861 is separate from a VNIC or VN chip or card 851. The VSSL card includes a VSSL chip 867. In some embodiments, the VSSL chip 867 polls transmit and receive queues associated with various servers. When it sees a packet in a server transmit queue, it pulls the packet and forwards associated commands to an SSL chip 869. SSL chip 869 can be one of a number of available SSL accelerators, such as the Nitrox Chip available from Cavium Networks of Mountain View, Calif. It should be noted that although a VSSL card 861 and a VN chip 851 are shown, virtualization logic and accelerator functionality can also be implemented in a single chip. Alternatively, a VN chip 851 may be separated out into multiple components and implemented as a card. In still other implementations, all virtualization logic for the VN chip 851, the VSSL card 861, and any other components is implemented in a single device. In one embodiment, an SSL chip 869 includes general purpose processor cores and specialized cryptography cores included on a single ASIC. The cryptography cores may include SSL cores, IP Security (IPSec) cores, SSL-VPN cores, XML/web services cryptography cores, storage and fibre channel data cryptography cores, and email data cryptography cores.

IOP 863 is configured to perform context management for SSL chip 869. According to various embodiments, an SSL agent runs on IOP 863. The SSL agent manages and allocates key memory and context memory. A context is used for each SSL connection. A context is allocated before a new SSL connection is established. According to various embodiments, context can be established in several manners.

A server can send a context allocation request to the SSL transmit queue. The VSSL chip 867 pulls this request and notifies the SSL agent running on IOP 863. The SSL agent allocates a new context and passes an index back to the VSSL chip 867. The VSSL chip 867 sends the response back to the server's receive queue. An application will now have a context allocated for it and the context can be passed in for all SSL requests.

Alternatively, an SSL agent could allocate a pool of contexts per server. Whenever an application needs a new context, it could get the context locally from the VSSL driver (which keeps a cache of the contexts). Once the VSSL driver's cache runs out of contexts, it sends a request to the SSL Agent to obtain additional contexts.

According to various embodiments, a VNIC chip or VN chip 851 is also coupled to the I/O Bus switch 821 through optional translation logic 823. The VN chip 851 has I/O ports 871-877 such as PCI Express interfaces coupled to the I/O bus switch 821. The VN chip 851 also has a connection with the processor subsystem 813 and a series of network interfaces 881-887 connecting the VN chip 851 to external network entities. In other examples, the VN chip may not include NIC interfaces and instead may be connected to conventional NICs.

The VNIC chip includes classifier logic 847, a queue manager 845, and a buffer manager 843. According to various embodiments, the classifier logic 847 includes parse and lookup logic configured to identify information such as a packet destination server and priority. Classifier logic can also be used to filter incoming data or apply traffic policing policies. In some instances, classifier logic can be used to block packets in order to implement a firewall. In one embodiment, classifier logic 847 parses a packet and uses the information in the packet to identify entries in lookup tables. The data is then buffered. Buffer manager 843 manages data in memory associated with the VN chip 851. Queue manager 845 manages descriptors for data posted. A descriptor can include a reference to a memory location, a length, a source port, and a multicast count, as well as other parameters.

In one example, classifier logic 847 determines that the packet received is a high priority packet and should be placed in a high priority queue by the buffer manager 843. Parameters provided may include a pointer, a length, a source port, a multicast count, and a queue identifier. The data is then placed into memory and information referencing the data such as a pointer and a length is posted into a buffer ring or a descriptor ring. When a connected server successfully arbitrates for bus access, the server reads the buffer ring or descriptor ring and obtains the data from memory associated with the VN chip. According to various embodiments, the server reads the data directly into its own memory.

Each individual server may also include descriptor queues. As will be appreciated, the servers connected to the I/O Bus Switch and the resource virtualization switch arbitrate for access to the I/O Bus. When access is obtained, data can be read from memory associated with one of the server based on the information provided in the descriptor queues.

Redundancy mechanisms are also provided to allow continued operation in the event that a NIC or other resource fails or a resource virtualization switch itself fails. Redundancy mechanisms can be managed by a VNIC device or VN chip, a resource virtualization switch, or by the individual servers themselves.

Figure 9:
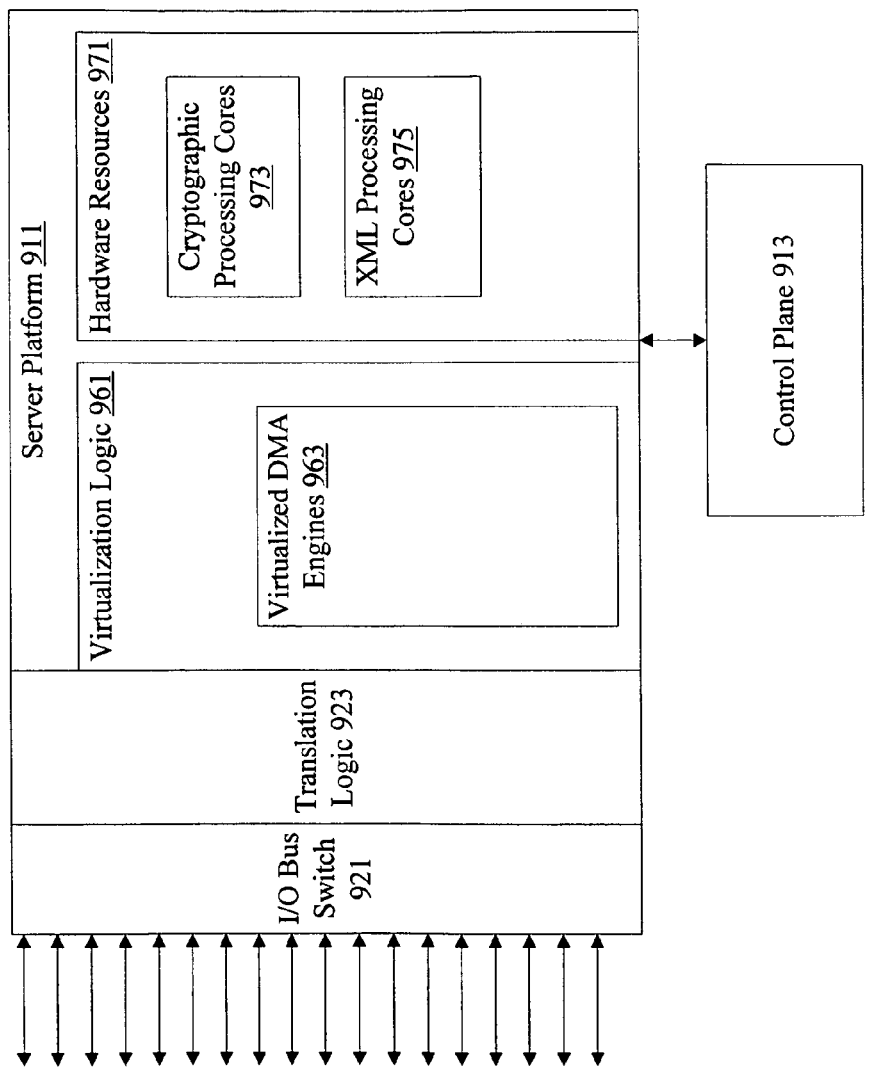
FIG. 9 is a diagrammatic representation showing a resource virtualization switch platform with virtualized DMA engines.

FIG. 9 is a diagrammatic representation depicting an embodiment of a resource virtualization switch using virtual Direct Memory Access (DMA) engines. According to various embodiments, a virtual DMA engine and a particular resource is assigned to each application, guest operating system, system image, virtual server, or physical server to provide true hardware acceleration on demand.

An I/O bus switch 921 is connected to multiple computer systems using an I/O bus such as a PCI Express bus and translation logic 923. Virtualization logic 961 obtains data such as descriptor data from individual servers and provides the data to hardware resources 971. In some examples, data transfer is performed using virtualized Direct Memory Access (DMA) mechanisms to allow minimal processor involvement during data transfers. In some embodiments, a descriptor is provided on a descriptor queue. The descriptor includes addresses, lengths, and other data parameters. A virtualized DMA engine 963 in virtualization logic 961 reads the descriptor and arbitrates for I/O bus access as needed, and directly transfers the block of data in memory to an appropriate hardware resource 971. In one embodiment, the hardware resources 971 include XML cores 975 and cryptographic cores 973. Cryptographic cores can include cores specifically configured for processing Secure Socket Layer SSL, IP Security (IPSec), storage and fibre channel data, and email data.

Figure 10:
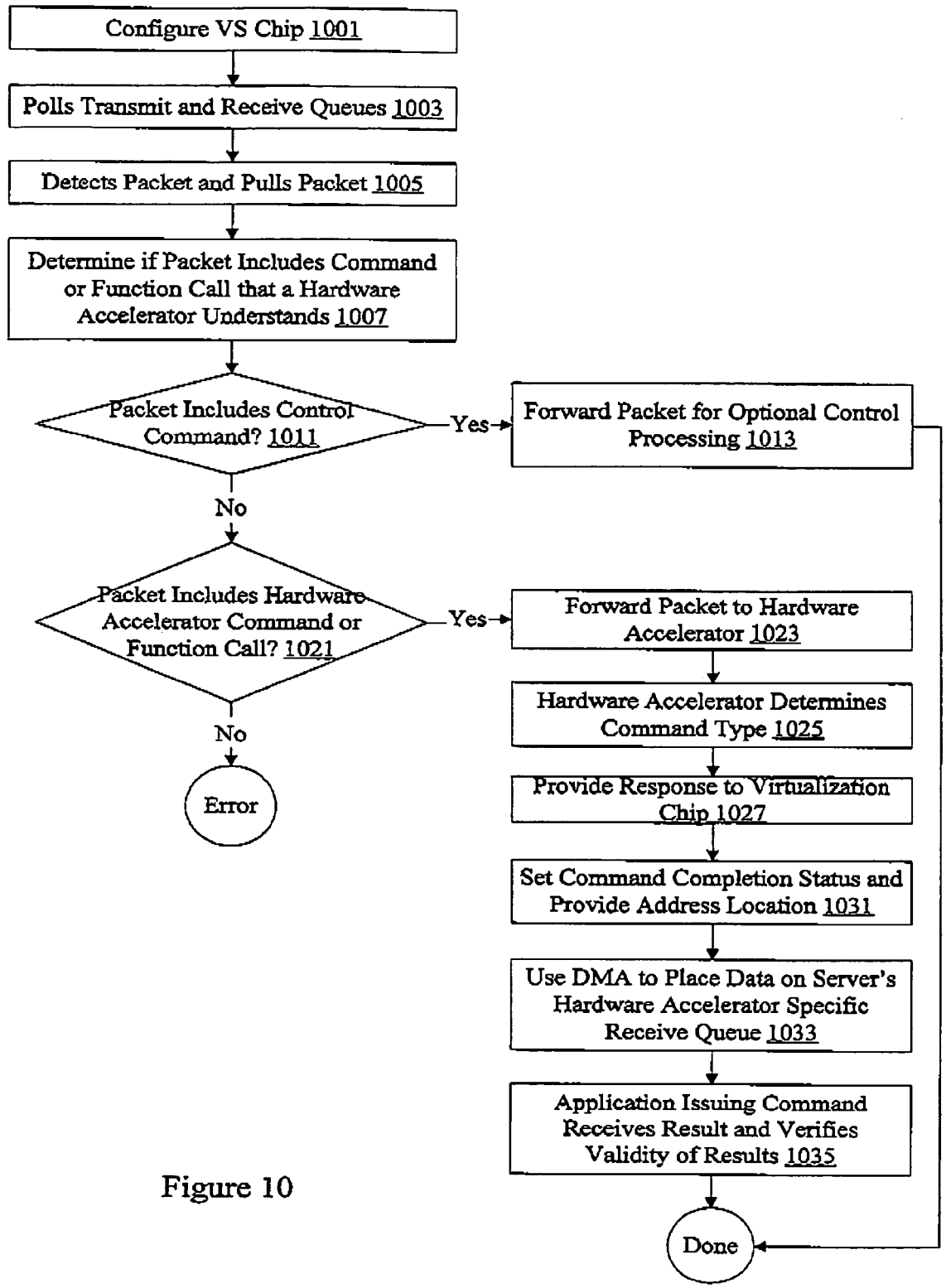
FIG. 10 is a flow process diagram depicting data path processing.

FIG. 10 is a flow process diagram depicting hardware accelerator processing. At 1001, a hardware accelerator such as an XML accelerator or a cryptography accelerator is configured to poll transmit and receive queues associated with particular servers. At 1003, polls transmit and receive queues. At 1005, detects a packet on a transmit queue and pulls the packet. According to various embodiments, virtualization circuitry determines at 1007 if the packet includes a command or function call that the hardware accelerator understands. If the packet includes a control command at 1011, the packet is forwarded at 1013 for optional control processing. Otherwise, it is determined if the packet includes a hardware accelerator command at 1021. If the packet includes a hardware accelerator command or function call, the packet is forwarded to the hardware accelerator at 1023.

The hardware accelerator determines the command type at 1025. According to various embodiments, the command type may be encryption or XML processing related. When the command or function processing is complete, a response is provided to the virtualization chip or virtualization circuitry at 1027. The hardware accelerator also sets the command completion status and provides an address location at 1031. The virtualization chip detects that the command is complete, and takes the results and uses either DMA to transfer the data to the server or places the data on a selected server receive queue at 1033. The application issuing the command gets the result and verifies that the results look valid at 1035.

Redundancy mechanisms are also provided to allow continued operation in the event that a resource or a resource virtualization switch itself fails. Redundancy mechanisms can be managed by virtualization logic. An example showing redundancy for a network interface card will now be shown. However, it should be noted that the redundancy mechanisms can be applicable to a variety of peripheral components and peripheral interfaces. In one example, redundancy is managed by virtualization logic included associated with a VNIC device or VN chip, a resource virtualization switch, or by the individual servers themselves.

In addition, although exemplary techniques and devices are described, the above-described embodiments may be implemented in a variety of manners, media, and mechanisms. For instance, instructions and data for implementing the above-described invention may be stored on a disk drive, a hard drive, a floppy disk, a server computer, or a remotely networked computer. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A method for performing verification testing, the method comprising:
    providing an input data sequence including a checking header, wherein the checking header includes information characterizing a relationship between the input data sequence and an output data sequence;
    encrypting the input data sequence including the checking header to obtain an encrypted input data sequence including an encrypted checking header;
    sending the encrypted input data sequence to a design under test, wherein the design under test performs processing on the encrypted input data sequence and provides an encrypted output data sequence;
    decrypting the encrypted output data sequence;
    determining a relationship between the output data sequence and the input data sequence by using the checking header to determine that the design under test is operating properly.

2. The method of claim 1, wherein the design under test is a resource virtualization switch.

3. The method of claim 1, wherein the design under test is virtualization logic associated with a resource virtualization switch.

4. The method of claim 1, wherein the design under test is virtualization application specific integrated circuit (ASIC) associated with a resource virtualization switch.

5. The method of claim 1, wherein the checking header identifies content of the input data sequence.

6. The method of claim 1, wherein the checking header identifies a path the input data sequence is supposed to follow.

7. The method of claim 1, wherein the checking header identifies a software descriptor.

8. The method of claim 1, wherein the checking header identifies a packet flow.

9. The method of claim 1, wherein the checking header identifies a memory address where the output data sequence should be stored.

10. The method of claim 1, wherein the checking header allows comparison of fields included in the output data sequence to expected fields.

11. The method of claim 1, wherein encryption and decryption is disabled to debug a test data sequence.

12. The method of claim 1, wherein encryption and decryption are enabled to debug the design under test.

13. The method of claim 1, wherein the checking header identifies a software descriptor.

14. The method of claim 1, wherein the encrypted data sequence includes an encrypted transaction identifier and an encrypted sequence identifier.

15. The method of claim 14, wherein the TCP/IP headers remain unencrypted.

16. The method of claim 14, further comprising adding an entry to a transaction table prior to encrypted the data sequence.

17. The method of claim 14, wherein the data sequence is a part of a packet.

18. The method of claim 14, wherein the checking header includes a pointer to a transaction table.

19. A computer readable storage medium having computer code embedded therein, the computer readable storage medium comprising:
   computer code for providing an input data sequence including a checking header, wherein the checking header includes information characterizing a relationship between the input data sequence and an output data sequence;
   computer code for encrypting the input data sequence including the checking header to obtain an encrypted input data sequence including an encrypted checking header;
   computer code for sending the encrypted input data sequence to a design under test, wherein the design under test performs processing on the encrypted input data sequence and provides an encrypted output data sequence;
   computer code for decrypting the encrypted output data sequence;
   computer code for determining a relationship between the output data sequence and the input data sequence by using the checking header to determine that the design under test is operating properly.

20. The computer readable storage medium of claim 19, wherein the design under test is a resource virtualization switch.

21. The computer readable storage medium of claim 19, wherein the design under test is virtualization logic associated with a resource virtualization switch.

22. The computer readable storage medium of claim 19, wherein the design under test is virtualization application specific integrated circuit (ASIC) associated with a resource virtualization switch.

23. The computer readable storage medium of claim 19, wherein the checking header identifies content of the input data sequence.

24. The computer readable storage medium of claim 19, wherein the checking header identifies a path the input data sequence is supposed to follow.

25. The computer readable storage medium of claim 19, wherein the checking header includes a pointer to a transaction table.

26. A system for performing verification testing, the system comprising:
   means for providing an input data sequence including a checking header, wherein the checking header includes information characterizing a relationship between the input data sequence and an output data sequence;
   means for encrypting the input data sequence including the checking header to obtain an encrypted input data sequence including an encrypted checking header;
   means for sending the encrypted input data sequence to a design under test, wherein the design under test performs processing on the encrypted input data sequence and provides an encrypted output data sequence;
   means for decrypting the encrypted output data sequence;
   means for determining a relationship between the output data sequence and the input data sequence by using the checking header to determine that the design under test is operating properly.

27. The system of claim 26, wherein the design under test is a resource virtualization switch.

28. The system of claim 26, wherein the design under test is virtualization logic associated with a resource virtualization switch.

29. The system of claim 26, wherein the design under test is virtualization application specific integrated circuit (ASIC) associated with a resource virtualization switch.

30. The system of claim 26, wherein the checking header identifies content of the input data sequence.

31. The system of claim 26, wherein the checking header identifies a path the input data sequence is supposed to follow.

32. The system of claim 26, wherein the checking header identifies a software descriptor.

33. The system of claim 26, wherein the checking header identifies a packet flow.

34. The system of claim 26, wherein the checking header identifies a memory address where the output data sequence should be stored.

* * * * *